United States Patent
Namiki et al.

(10) Patent No.: US 6,831,791 B2
(45) Date of Patent: Dec. 14, 2004

(54) OPTICAL SYSTEM FOR OPTICAL COMMUNICATIONS AND METHOD OF MANUFACTURING THE SAME

(75) Inventors: Mitsuru Namiki, Hanno (JP); Hirofumi Tsuchida, Kunitachi (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/745,541

(22) Filed: Dec. 29, 2003

(65) Prior Publication Data

US 2004/0137236 A1 Jul. 15, 2004

(30) Foreign Application Priority Data

Jan. 10, 2003 (JP) ........................................ 2003-004435

(51) Int. Cl.⁷ ................................................ G02B 3/00
(52) U.S. Cl. ...................... 359/652; 359/653; 359/654; 501/63; 501/64; 501/72; 65/17.2; 65/31
(58) Field of Search ................................. 359/652–654; 501/63, 64, 72; 65/17.2, 31

(56) References Cited

U.S. PATENT DOCUMENTS

| | | | | |
|---|---|---|---|---|
| 4,389,233 A | * | 6/1983 | Kurosaki et al. | 65/31 |
| 5,068,208 A | * | 11/1991 | Haun et al. | 501/12 |
| 6,476,975 B1 | * | 11/2002 | Yoshii et al. | 359/652 |
| 2003/0147136 A1 | * | 8/2003 | Pan et al. | 359/484 |

FOREIGN PATENT DOCUMENTS

JP  08-286076  11/1996

* cited by examiner

*Primary Examiner*—Evelyn A. Lester (57) ABSTRACT

An optical system for optical communications is composed of a transparent material having a refractive index distribution formed by changing the molar ratio of metal oxide with valence of 2 or more. The metal oxide with valence of 2 or more includes, for example, $Fe_2O_3$. Using such an optical system for optical communications, optical communication components such as an optical fiber collimator and an optical isolator are composed.

16 Claims, 6 Drawing Sheets

OPTICAL SYSTEM FOR OPTICAL COMMUNICATIONS AND METHOD OF MANUFACTURING THE SAME

CROSS-REFERENCE TO RELATED APPLICATIONS

This application is based upon and claims the benefit of priority from the prior Japanese Patent Application No. 2003-004435, filed Jan. 10, 2003, the entire contents of which are incorporated herein by reference.

BACKGROUND OF THE INVENTION

1. Field of the Invention

The present invention relates to an optimum lens system suitable for the optical communication field, an optical system for optical communications such as optical communication components utilizing such an optical communication lens system, and a method of manufacturing the same.

2. Description of the Related Art

Optical communication components as proposed in Jpn. Pat. Appln. KOKAI Publication No. 8-286076 often have problems in coupling with optical fibers. For example, in optical isolators and optical circulators, light transmitted in the optical fibers is once taken out of the optical fibers, and is processed as desired, and put back into the optical fibers. In this process, the light loss must be minimized. Alternatively, when using a laser diode (LD), the laser light oscillated from the LD must be inserted into the optical fibers at as high a coupling efficiency as possible.

Lenses are widely used in order to enhance the coupling efficiency between optical communication components and optical fibers. Examples of lenses used in such a case include a ball lens, a spherical lens, an aspherical lens, and a graded index lens. Above all, the radial type graded index lens (hereinafter called GRIN lens) of tubular shape and having refractive index distribution in the radial direction is widely used because of its ease of alignment in assembling.

Communication traffic is expanding explosively, and the wavelength bands of light for use in optical communications are extending yearly. In future, it is predicted that light of a wide band extending up to 1250 to 1650 nm may be transmitted in a single optical fiber. Further, an Er-doped fiber amplifier which is one of the indispensable technologies in optical communications may use excited light of 980 nm in order to amplify the optical communication wave band of around 1550 nm. In such a case, lights of a very wide band of 980 to 1650 nm coexist in the same optical fiber. Accordingly, the lens system for optical communications for use in the Er-doped fiber amplifier or the like is desired to function favorably in the optical communication wavelength band of 980 to 1650 nm.

BRIEF SUMMARY OF THE INVENTION

According to a first aspect of the present invention, there is provided an optical system for optical communications, comprising a graded index lens composed of a transparent material including at least one metal oxide with valence of 2 or more, and having a refractive index distribution formed by changing the molar ratio of the metal oxide.

According to a second aspect of the present invention, there is provided a method of manufacturing an optical system for optical communications, comprising: forming a transparent material having a refractive index distribution by changing the molar ratio of metal oxide with valence of 2 or more; and configuring a graded index lens from the transparent material.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring now to the drawings, preferred embodiments of the invention will be described in detail below.

First, a basic configuration of each embodiment will be explained. The optical communication lens system of each embodiment is composed of a GRIN lens having the refractive index distributed in the radial direction, and the refractive index is expressed by Formula (a):

$$N(r)=N_0+N_1r^2+N_2r^4+\ldots \quad (a)$$

where $N_0$ denotes a central refractive index, $N_i$ (i=1, 2, ...) denotes a coefficient showing the refractive index distribution, and r denotes a distance in the radial direction from the center of the optical axis.

The radial type GRIN lens can be realized by varying the composition of a transparent material (glass) from the center to the periphery of the lens. To determine the refractive index or Abbe number from the composition of the glass, for example, an HSD method disclosed in Applied Optics Vol. 22, No. 3 (1983), p. 432 is known. This method is applied in the present invention. By this HSD method, it is possible to predict the glass composition distribution of the radial type GRIN lens capable of correcting chromatic aberration favorably in a visible region. The following explanation shows application of the HSD method in an optical communication wavelength band (980 to 1650 nm).

Supposing the reference wavelength in the optical communication wavelength band (980 to 1650 nm) to be 980 nm, 1550 nm, and 1650 nm, the dispersion coefficients $V_0$, $V_1$ and axial chromatic aberration PAC in the optical communication wavelength band of the radial type GRIN lens can be expressed by Formulas (b), (c), and (d), respectively:

$$V_0=(N_{0,1550}-1)/(N_{0,980}-N_{0,1650}) \quad (b)$$

$$V_i=(N_{i,1550})/(N_{i,980}-N_{i,1650})(i=1, 2 \ldots) \quad (c)$$

$$PAC=K(\phi_S/V_0+\phi_m/V_l) \quad (d)$$

where, in (c), $N_{i,w}$ are coefficients representing the refractive index and refractive index distribution at reference wavelength of w (w=980 nm, 1550 nm, 1650 nm), K is a constant relating to height of ray, $\phi_s$ is power by the surface of the optical communication lens system, and $\phi_m$ is power of the GRIN medium.

Figure 1:
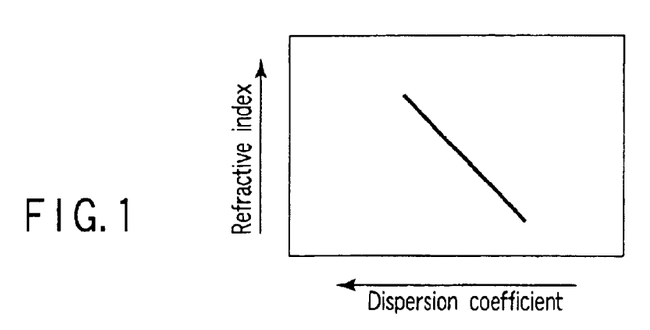
FIG. 1 is a diagram showing the relation between a refractive index and a dispersion coefficient of a radial type GRIN lens whose axial chromatic aberration can be favorably corrected.

Herein, to reduce the axial chromatic aberration PAC of the radial type GRIN lens, it is required to satisfy $V_0<V_1$ and to have the relation between the refractive index and the dispersion coefficient as shown in FIG. 1 as disclosed, for example, in Jpn. Pat. Appln. KOKAI Publication No. 5-88003. Herein, in the optical communication wavelength band (980 to 1650 nm), it is attempted to compare how the relation between the dispersion coefficients $V_0$, $V_1$ and the refractive index of the radial type GRIN lens changes depending on the composition of the glass.

First, in the radial type GRIN lens using $SiO_2$—$TiO_2$—$Tl_2O$ glass of three components including monovalent metal oxide $Tl_2O$, the relation between the refractive index and the dispersion coefficient by varying the composition ratio can be determined by the HSD method. At this time, the molar ratio of $SiO_2$ and $TiO_2$ in the radial direction is supposed to be 100: m (m=10 to 90). That is, by fixing the molar number of $SiO_2$, the molar number of $Tl_2O$ is changed within a range capable of calculating the refractive index by the HSD method. Values of the dispersion coefficients $V_0$ and $V_1$ at this time are shown in Table 1, and it is known that the relation of $V_0>V_1$ is always established regardless of the composition ratio.

TABLE 1

| Molar ratio | | | | Central refractive index | Refractive index difference | Dispersion coefficient | |
|---|---|---|---|---|---|---|---|
| $SiO_2$ | $TiO_2$ | $Tl_2O$ | | $N_0$ | $\Delta n$ | $V_0$ | $V_1$ |
| 100 | 90 | 20 | → 0 | 1.9596 | 0.0333 | 44.31 | 14.55 |
| 100 | 80 | 40 | → 0 | 1.9607 | 0.0683 | 42.27 | 16.44 |
| 100 | 70 | 60 | → 0 | 1.9615 | 0.1052 | 40.90 | 18.20 |
| 100 | 60 | 80 | → 0 | 1.9621 | 0.1444 | 39.91 | 19.84 |
| 100 | 50 | 100 | → 0 | 1.9625 | 0.1863 | 48.95 | 21.37 |
| 100 | 40 | 120 | → 0 | 1.9629 | 0.2332 | 38.59 | 22.91 |
| 100 | 30 | 140 | → 0 | 1.9632 | 0.2876 | 38.12 | 24.51 |
| 100 | 20 | 160 | → 0 | 1.9678 | 0.3515 | 37.84 | 26.09 |
| 100 | 10 | 180 | → 0 | 1.9778 | 0.4231 | 37.42 | 27.53 |
| 100 | 0 | 200 | → 0 | 1.9865 | 0.4792 | 37.15 | 28.26 |

Figure 2:
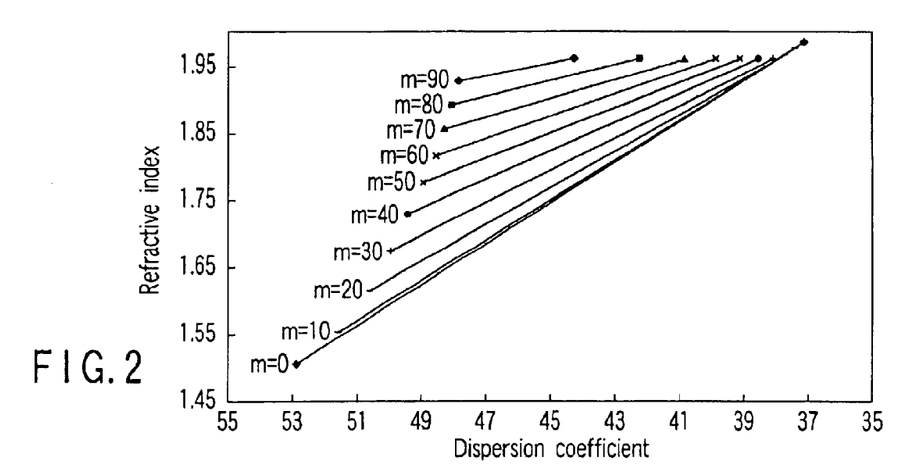
FIG. 2 is a diagram showing the relation between a refractive index and a dispersion coefficient of a radial type GRIN lens realized by varying the molar ratio of monovalent oxide in the radial direction.

The relation between the refractive index and the dispersion coefficient of the radial type GRIN lens shown in Table 1 is as shown in FIG. 2, and it is found that the relation in FIG. 2 shows a different change from the relation in FIG. 1. Further, another monovalent metal oxide $M_2O$ (M being one of Na, K, Rb, and Cs) was investigated, and a similar aptitude was obtained. Accordingly, even if the molar ratio of monovalent metal oxide $M_2O$ is changed in the radial direction, it seems difficult to realize a radial type GRIN lens capable of correcting the chromatic aberration favorably.

By contrast, in the radial type GRIN lens using $SiO_2$—$TiO_2$—MO glass of three components containing bivalent metal oxide MO (M being one of Ca, Sr, Zn, and Ba) instead of the monovalent metal oxide as in the invention, when the molar ratio is varied similarly in the radial direction, the composition ratio satisfying $V_0<V_1$ can be obtained as shown in Table 2.

TABLE 2

| | Molar ratio | | | | Central refractive index | Refractive index difference | Dispersion coefficient | |
|---|---|---|---|---|---|---|---|---|
| | $SiO_2$ | $TiO_2$ | MO | | $N_0$ | $\Delta n$ | $V_0$ | $V_1$ |
| Ca | 100 | 20 | 70 | → 30 | 1.6421 | 0.0223 | 56.21 | 258.6 |
| Sr | 100 | 20 | 80 | → 50 | 1.6571 | 0.0138 | 57.23 | 1234.7 |
| Ba | 100 | 50 | 65 | → 25 | 1.8037 | 0.0219 | 52.44 | 281.51 |
| Zn | 100 | 20 | 50 | → 20 | 1.6207 | 0.0157 | 55.35 | 658.07 |

Figure 3:
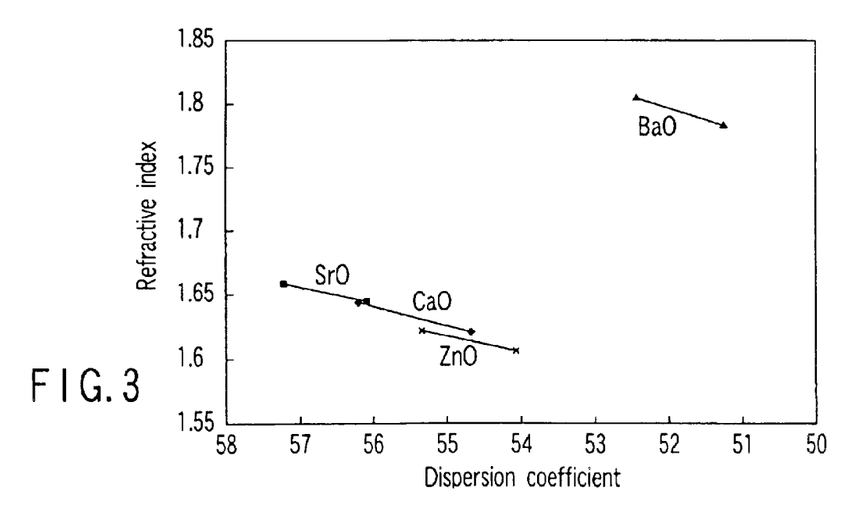
FIG. 3 is a diagram showing the relation between a refractive index and a dispersion coefficient of a radial type GRIN lens realized by varying the molar ratio of bivalent oxide in the radial direction.

The relation between the refractive index and the dispersion coefficient of metal elements in Table 2 is shown in FIG. 3, which shows similar changes as in FIG. 1 in all metal oxides. That is, in the radial type GRIN lens which changes the molar ratio of the bivalent metal oxide in the radial direction, chromatic aberration can be corrected favorably. It is hence possible to realize an optical communication lens system suited to use in a very wide optical communication wavelength band of 980 to 1650 nm.

Next, using an oxide of at least one metal element selected from metal elements with valence of 2 or more, that is, a metal G group (Nb, Ta, Ti, Zr, Fe) and a metal F group (Ca, Sr, Ba, Zn, La, In, Y, Zr, Ta), the concentrations of the respective metal element are distributed in mutually reverse directions with respect to the radial direction, or the molar number of the metal oxide of either G group or F group metal is varied, and the relation between the refractive index and the dispersion coefficient is determined by the HSD method, and the results as shown in Table 3 are obtained.

Herein, the molar ratio of $SiO_2$ is 100 although not shown in the table.

TABLE 3

| Metal G group | | | Metal F group | | | Refractive index | | Dispersion coefficient | |
|---|---|---|---|---|---|---|---|---|---|
| Central | | Peripheral | Central | | Peripheral | Central | $\Delta n$ | $V_0$ | $V_1$ |
| Nb | 11 → | 12 | Ca | 100 → | 45 | 1.65502 | 0.0202 | 59.46 | 180.07 |
|  | 11 → | 12 | Sr | 100 → | 45 | 1.66685 | 0.0239 | 59.99 | 175.58 |
|  | 12 → | 19 | Ba | 44 → | 9 | 1.67593 | 0.0159 | 57.37 | 152.46 |
|  | 10 → | 11 | Zn | 50 → | 2 | 1.61402 | 0.0237 | 58.40 | 201.56 |
|  | 4 → | 7 | Y | 20 → | 8 | 1.61035 | 0.0221 | 59.86 | 243.43 |
| Ta | 3 → | 9 | Ca | 65 → | 14 | 1.58721 | 0.0240 | 60.22 | 150.76 |
|  | 3 → | 9 | Sr | 57 → | 18 | 1.59329 | 0.0200 | 60.42 | 198.83 |
|  | 2 → | 10 | In | 25 → | 12 | 1.63159 | 0.0207 | 60.66 | 162.92 |
| Ti | 5 → | 10 | Ca | 50 → | 10 | 1.57433 | 0.0357 | 58.59 | 302.54 |
|  | 5 → | 10 | Sr | 40 → | 10 | 1.57467 | 0.0322 | 58.65 | 445.09 |
|  | 10 → | 15 | Ba | 38 → | 20 | 1.62583 | 0.0213 | 56.26 | 158.43 |
|  | 25 → | 25 | Ta | 25 → | 10 | 1.67582 | 0.0187 | 54.68 | 226.09 |
|  | 35 → | 35 | Zr | 35 → | 10 | 1.73087 | 0.0251 | 53.58 | 483.03 |
| Zr | 22 → | 30 | Ca | 70 → | 25 | 1.62749 | 0.0117 | 60.54 | 173.21 |
|  | 22 → | 30 | Sr | 20 → | 32 | 1.64196 | 0.0208 | 61.15 | 151.33 |
| Fe | 5 → | 5 | Ca | 24 → | 8 | 1.55676 | 0.0301 | 41.92 | 172.86 |
|  | 5 → | 5 | Sr | 20 → | 4 | 1.55732 | 0.0381 | 42.11 | 186.73 |
|  | 10 → | 10 | Ba | 25 → | 12 | 1.62883 | 0.0317 | 35.50 | 2228.35 |
|  | 5 → | 5 | Zn | 20 → | 7 | 1.54434 | 0.0223 | 41.38 | 212.75 |
|  | 23 → | 23 | La | 12 → | 5 | 1.73382 | 0.0494 | 27.08 | 153.23 |

In Table 3, the relation of $V_0 < V_1$ is satisfied in any case. At the same time, the relation between the refractive index and the dispersion coefficient changes, as in FIG. 1, and hence the chromatic aberration is favorably corrected also in this case. Therefore, by using the radial type GRIN lens realized by a varied combination of the metal G and F groups, it is possible to realize an optical communication lens system suited to use in a very wide optical communication wavelength band of 980 to 1650 nm.

The radial type GRIN lens can be manufactured by an ion exchange method and a sol-gel method. The ion exchange method can mainly transfer monovalent metal ions, while the sol-gel method is characterized by transferring not only monovalent but also bivalent or higher metal ions.

The radial type GRIN lens capable of favorably correcting chromatic aberration in the optical communication wavelength band of 980 to 1650 nm cannot be realized by monovalent metal oxide, but can be manufactured by varying the molar ratio of bivalent or higher metal oxides. Hence, the radial type GRIN lens for use in the optical communication lens system is preferred to be fabricated by the sol-gel method.

In the existing optical communication lens system, the radial type GRIN lens without chromatic aberration correction is used, and the dispersion coefficients $V_0$, $V_1$ are about 100 and 50, respectively. Therefore, judging from Formula (d), to reduce the axial chromatic aberration PAC, it is necessary to cancel by changing the signs of power of the medium and surface.

However, in the radial type GRIN lens for use in the optical communication lens system, since the surface is rarely provided with power, the chromatic aberration generated depends greatly on $V_1$, and this $V_1$ is as much as 50, thereby increasing generation of chromatic aberration. As a result, the coupling loss of the optical communication lens system and the single-mode fiber varies significantly depending on the wavelength. Hence, the above-described existing radial type GRIN lens can be used only in a specific range in the optical communication wavelength region. The problem of the chromatic aberration of the radial type GRIN lens for optical communications used at the present lies in the realization of the refractive index distribution due to change of the concentration of this monovalent metal oxide. As mentioned above, chromatic aberration cannot be suppressed by the refractive index distribution by concentration change of the monovalent metal oxide. By contrast, when the radial type GRIN lens is composed by varying the molar ratio of bivalent or higher metal oxide by the sol-gel method, it is easy to define $V_1$ at $V_1 > 100$, and as compared with the existing optical communication lens system, the radial type GRIN lens capable of correcting the chromatic aberration favorably can be realized.

Further, in the GRIN lens manufactured by a method other than the sol-gel method, such as an ion exchange method, controllable components are limited as compared with the sol-gel method, and chromatic aberration cannot be corrected favorably. In a GRIN lens in which chromatic aberration is not corrected, the chromatic aberration can be corrected by composing one surface by a diffractive optical element (DOE) having a positive power. The reason is explained below. A method of designing DOE conforms to Sweatt method (ultra-high index method) (W. C. Sweatt, Mathematical equivalence between a holographic optical element and an ultra-high index lens", J. Opt. Soc. Am., Vol. 69, No. 3 (1979), and the reference wavelength is 1.550 nm.

The axial chromatic aberration PAC of the lens system including the DOE is expressed by the following formula (d'):

$$PAC = K'(\phi_s/V_0 + \phi_m/V_I + \phi_D/V_D) \quad (d')$$

where K' is a constant relating to height of ray, $\phi_D$ and $V_D$ are power and dispersion coefficient of DOE, respectively. The dispersion coefficient of DOE is determined in formula (e):

$$V_D = (N_{D,1550} - 1)/(N_{D,980} - N_{D,1650}) \quad (e)$$

where $N_{D,1550}$, $N_{D,980}$, and $N_{D,1650}$ are respectively refractive indices at DOE wavelength of 1550 nm, 980 nm, and 1650 nm, and once the refractive index of reference wavelength is determined, regardless of the glass composition, other refractive indices are determined consequently. For example, supposing the refractive index of d line (wavelength 587.56 nm) to be 1001, the refractive indices of wavelength of 1550 nm, 980 nm, and 1650 nm are respectively 2638.03, 1667.92, and 2808.22, and at this time the dispersion coefficient $V_D$ in the wavelength band of 980 nm to 1650 nm is a negative value of −2.31.

Therefore, as clear from Formula (d'), by a positive power of DOE, the axial chromatic aberration can be reduced.

Further, in the radial type GRIN lens for use in the optical communication system, by forming the both ends in flat planes, not only the alignment and assembling can be facilitated, but also the cost can be lowered.

(First Embodiment)

A first embodiment of the invention relates to the optical communication lens system having the chromatic aberration corrected, as mentioned above. Exemplary examples of the first embodiment are shown below. In all optical communication lens systems, the lens thickness is selected such that the rear focus plane relating to wavelength of 1550 nm coincides with the final plane, and the refractive index $N_0$ and refractive index distributions N1, N2 show values at reference wavelength (1550 nm).

EXAMPLE 1

An optical communication lens system of Example 1 is composed of a radial type GRIN lens using Ba as a bivalent metal oxide shown in Table 2 and distributing the concentration in the radial direction by the sol-gel method. The specification of this Ba system GRIN lens is shown in Table 4.

TABLE 4

Specification of Example 1
f = 3.06, NA/0.327, Maximum image height 0.125 mm
r = ∞ d1 = 8,516 Optical communication lens
system 10 (Ba system GRIN lens)
r = ∞ d2 = 0
Ba system GRIN lens
Composition ratio (molar concentration)

|  | Central | Peripheral |
| --- | --- | --- |
| $SiO_2$ | 0.49 | 0.620 |
| $TiO_2$ | 0.20 | 0.255 |
| BaO | 0.31 | 0.125 |

Figure 4A:
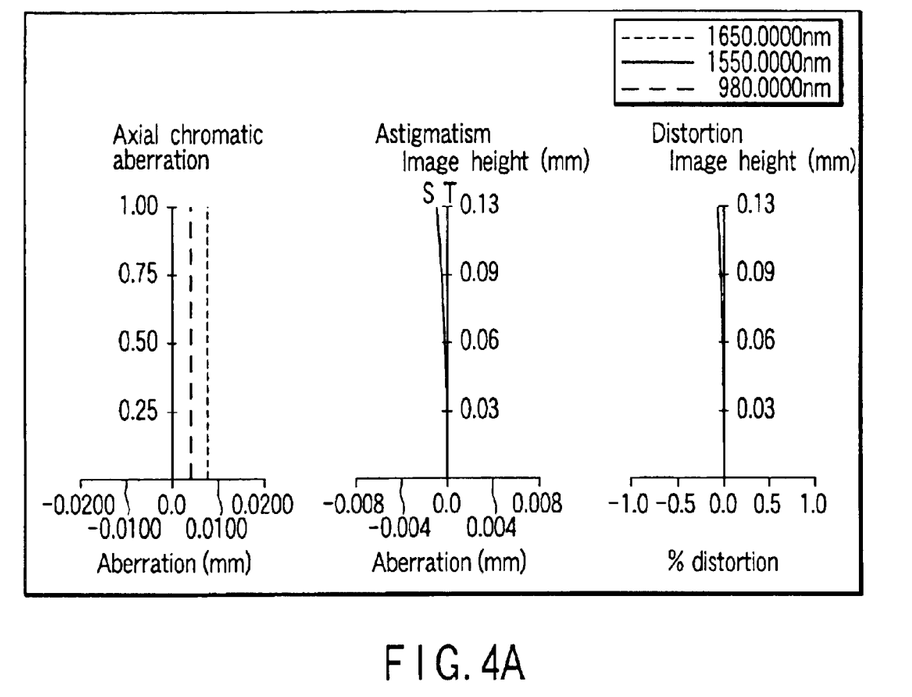
FIG. 4A is an aberration diagram of an optical communication lens system according to Example 1 of a first embodiment of the invention.
Figure 4B:
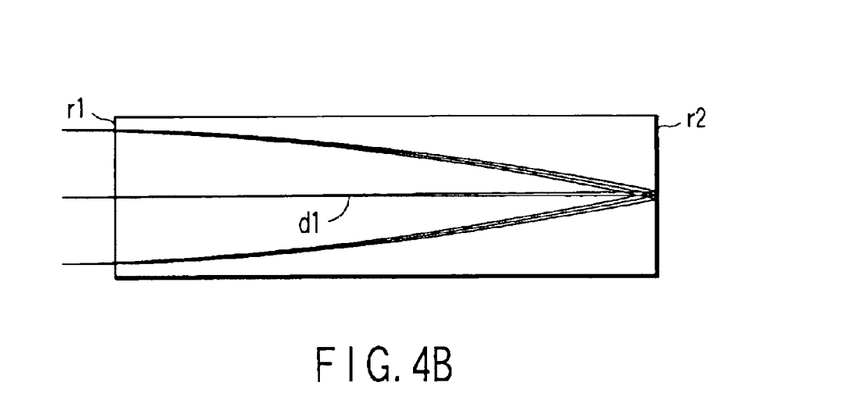
FIG. 4B is a sectional view explaining an optical path of the optical communication lens system according to Example 1 of the first embodiment of the invention.

$N_0 = 1.77134$,
$N_1 = -0.0313$,
$N_2 = 4.2 \times 10^{-4}$
$V_0 = 53.13$,
$V_1 = 151.29$ The axial chromatic aberration PAC, astigmatism, and distortion of this Ba system radial type GRIN lens are shown in FIG. 4A, and a sectional view is shown in FIG. 4B. In FIG. 4A, in a wavelength band of 980 to 1650 nm, the axial chromatic aberration is within 10 μm and is corrected very favorably, and at the same time, other aberrations are also corrected favorably at image height of 0.125 mm. Therefore, by using this radial type GRIN lens which changes the molar ratio of BaO in the radial direction, an optical communication lens system which functions favorably in an optical communication wavelength band of 980 to 1650 nm can be realized.

By the sol-gel method, even in the bivalent metal oxide other than BaO shown in Table 2, the radial type GRIN lens having the chromatic aberration corrected can be realized, and therefore similarly by another bivalent metal oxide, an optical communication lens system which functions favorably in an optical communication wavelength band of 980 to 1650 nm can be realized.

EXAMPLE 2

An optical communication lens system of Example 2 is composed of a radial type GRIN lens using La as a bivalent or higher metal oxide shown in Table 2 and distributing the concentration in the radial direction by the sol-gel method. The specification of Example 2 is shown in Table 5.

TABLE 5

Specification of Example 2
f = 2.22, NA/0.45, Maximum image height 0.125 mm
r1 = ∞ d1 = 5.876 Optical communication lens
system 10 (La system GRIN lens)
r2 = ∞ d2 = 0
La system radial type GRIN lens
Composition ratio (molar concentration)

|  | Central | Peripheral |
| --- | --- | --- |
| $SiO_2$ | 0.80 | 0.85 |
| $Fe_2O_3$ | 0.10 | 0.11 |
| $La_2O_3$ | 0.10 | 0.04 |

Figure 5A:
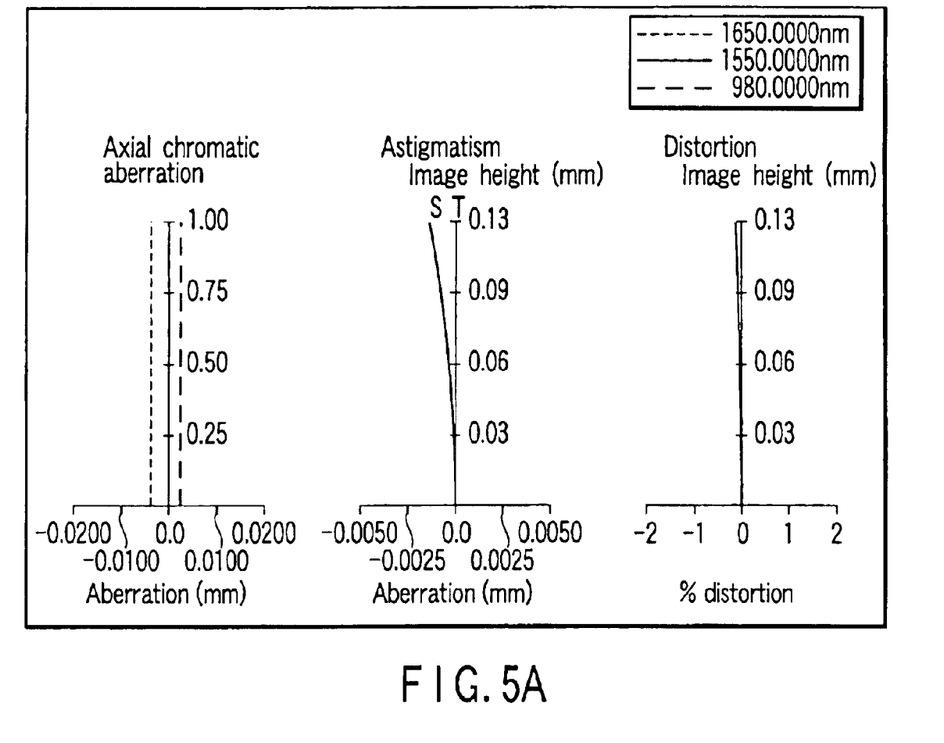
FIG. 5A is an aberration diagram of an optical communication lens system according to Example 2 of the first embodiment of the invention.
Figure 5B:
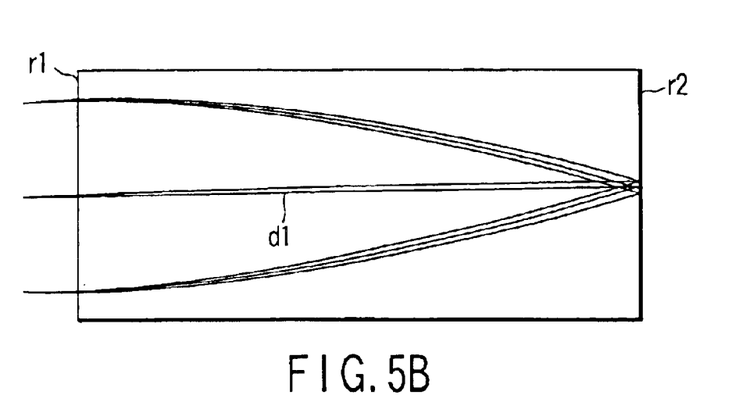
FIG. 5B is a sectional view explaining an optical path of the optical communication lens system according to Example 2 of the first embodiment of the invention.

$N_0 = 1.68385$,
$N_1 = -0.06016$,
$N_2 = 1.73 \times 10^{-3}$
$V_0 = 33.17$,
$V_1 = 111.81$ The axial chromatic aberration PAC, astigmatism, and distortion of this La system radial type GRIN lens are shown in FIG. 5A, and a sectional view is shown in FIG. 5B. In FIG. 5A, in a wavelength band of 980 to 1650 nm, the axial chromatic aberration is within 10 μm and is corrected very favorably, and at the same time, other aberrations are also corrected favorably at image height of 0.125 mm. Therefore, by using this radial type GRIN lens which changes the molar ratio of $La_2O_3$ in the radial direction, an optical communication lens system which functions favorably in an optical communication wavelength band of 980 to 1650 nm can be realized.

By the sol-gel method, the radial type GRIN lens can be realized by varied combinations of metal G group (Nb, Ta, Ti, Zr, Fe) and metal F group (Ca, Sr, Ba, Zn, La, In, Y, Zr, Ta) as shown in Table 3. By these radial type GRIN lenses, an optical communication lens system which functions favorably in an optical communication wavelength band of 980 to 1650 nm can be realized.

Although La is a rare earth element, since rare earth elements show similar characteristics, whole or part of $La_2O_3$ may be replaced with other rare earth elements.

EXAMPLE 3

An optical communication lens system of Example 3 is composed of a combination of a GRIN lens without chromatic aberration correction and an aspherical DOE as shown in Table 6. In this DOE, the aspherical shape is expressed as follows, supposing the optical axis to be z, assuming the light propagation direction to be positive, and the direction orthogonal to the optical axis to be y:

$$z=(y^2/r)[1+\{1-(1+K)(y/r)^2\}^{1/2}A_4y^4+ \ldots$$

where r is the radius of curvature of vicinal axis of DOE, K is a conical index, and $A_4$ is a fourth-order aspherical index. An equivalent refractive index of DOE at each wavelength can be determined by supposing the refractive index of d line (587.56 nm) to be 1001. The specification of Example 3 is shown below.

TABLE 6

Specification of Example 3
f = 1.47, NA/0.341, Maximum image height 0.125 mm
r1 = 1.296 × 10$^5$ d1 = 0 DOE
r2 = ∞ d2 = 3.696 Optical communication lens
system 10 GRIN lens
r2 = ∞
DOE
Radius of curvature of vicinal axis of DOE
r = r1 = 1.296 × 10$^5$ Conical index K = 0
Fourth-order aspherical index
$A_4 = -5.6557 \times 10^{-6}$
$N_{D,1550} = 2639.03$
$V_D = -2.31$
GRIN lens
Composition ratio (molar concentration)

|  | Central | Peripheral |
|---|---|---|
| $SiO_2$ | 0.59 | 0.59 |
| $Na_2O$ | 0.06 | 0.02 |
| $K_2O$ | 0.03 | 0.15 |
| $Tl_2O$ | 0.11 | 0.03 |
| ZnO | 0.20 | 0.20 |
| $Zr_2O$ | 0.01 | 0.01 |

$N_0 = 1.634$,
$N_1 = -0.14$
$V_0 = 83.98$,
$V_1 = 46.29$

Figure 6A:
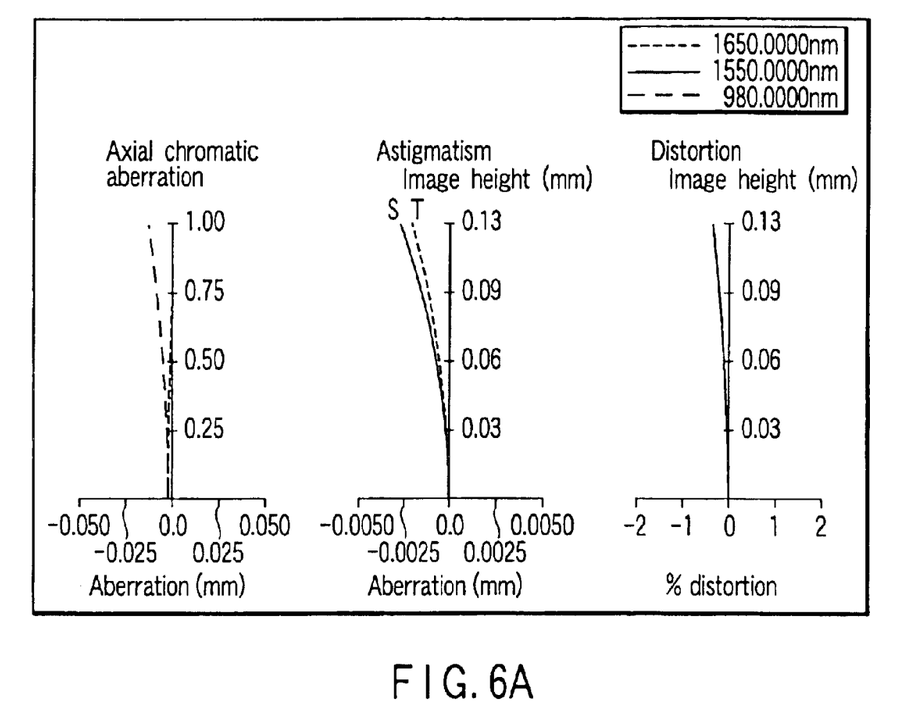
FIG. 6A is an aberration diagram of an optical communication lens system according to Example 3 of the first embodiment of the invention.
Figure 6B:
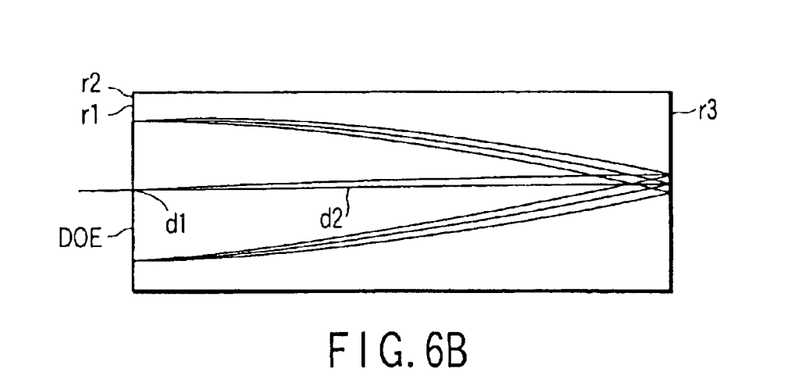
FIG. 6B is a sectional view explaining an optical path of the optical communication lens system according to Example 3 of the first embodiment of the invention.
Figure 7:
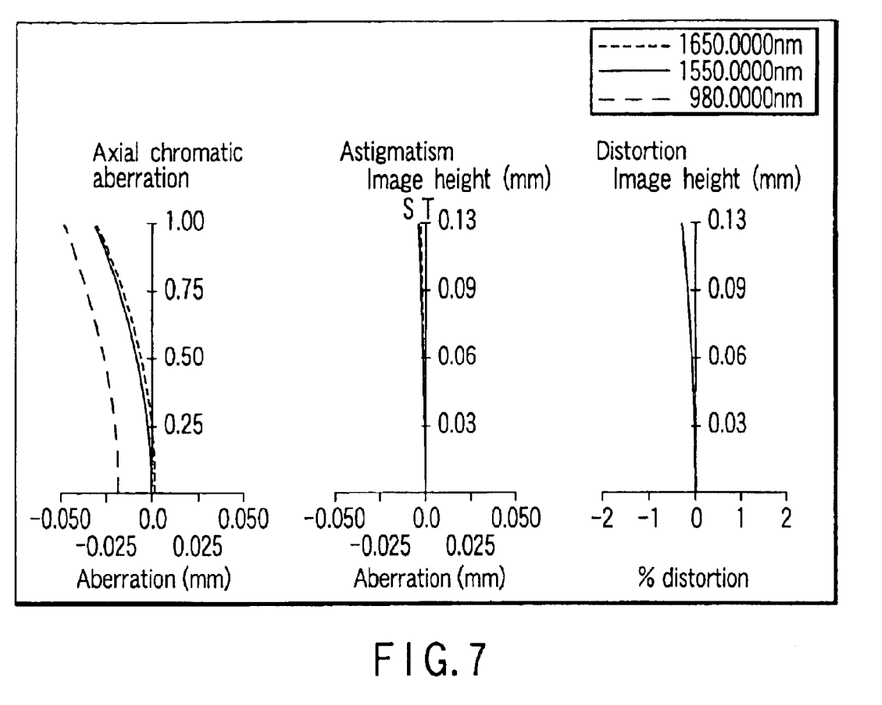
FIG. 7 is an aberration diagram of the optical communication lens system in the same specification as in Example 3 of the first embodiment except that an aspherical DOE is not provided.

The axial chromatic aberration PAC and other aberrations of the GRIN lens having the aspherical DOE of Example 3 are shown in FIG. 6A, and a sectional view is shown in FIG. 6B. By way of comparison, in the same specification as in Example 3, the aberration without aspherical DOE is shown in FIG. 7. In FIG. 7, the axial chromatic aberration PAC is deviated by 20 μm or more in the wavelength band of 980 to 1650 nm, but in FIG. 6A, the axial chromatic aberration PAC is within 10 μm and is corrected very favorably. That is, even in the GRIN lens without chromatic aberration correction, by using the DOE, the chromatic aberration can be corrected. Therefore, even an optical communication lens system usable in an entire optical communication wavelength band (980 to 1650 nm) can be realized. Further, even in a GRIN lens other than mentioned herein, by using the DOE suited to a specific GRIN lens, the chromatic aberration can be corrected.

(Second Embodiment)

A second embodiment of the invention relates to an optical fiber collimator composed of an optical communication lens system of any one of Examples 1 to 3 and at least one optical fiber.

EXAMPLE 4

Figure 8A:
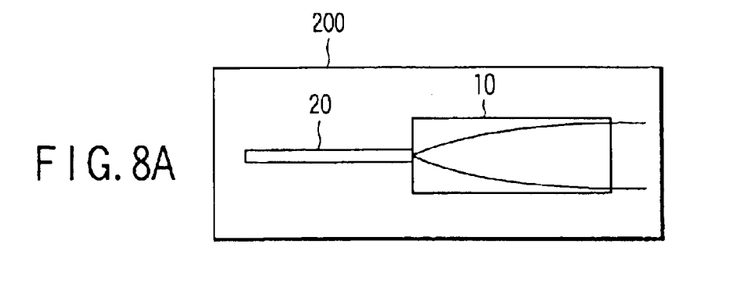
FIG. 8A is a block diagram of an optical fiber collimator according to Example 4 of a second embodiment of the invention, in the case of functioning as a collimator on an exit light from a single-mode optical fiber.
Figure 8B:
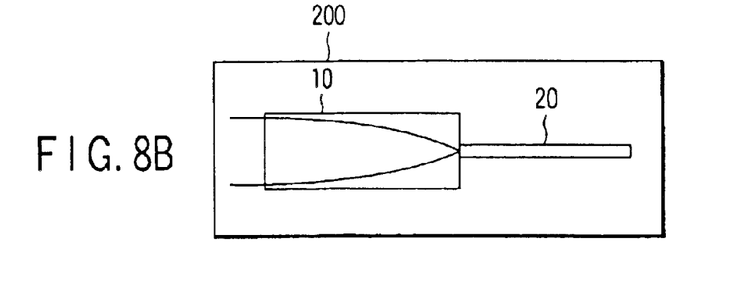
FIG. 8B is a block diagram of the optical fiber collimator according to Example 4 of the second embodiment of the invention, in the case of functioning as a condenser lens for coupling the collimated light entering the optical communication lens system to a single-mode optical fiber.

An optical fiber collimator 200 of Example 4 is shown in FIGS. 8A and 8B. This optical fiber collimator 200 is composed of an optical communication lens system 10 and a single-mode optical fiber (SMF) 20. FIG. 8A show a case of functioning as a collimator for the exit light from the SMF 20, and FIG. 8B shows a case of functioning as a condenser lens for coupling the incident collimating light to the optical communication lens system 10 to the SMF 20.

Herein, the Ba system GRIN lens shown in Example 1 is used as the optical communication lens system 10. Since the chromatic aberration is favorably corrected as shown in FIG. 5, it functions favorable in any application of FIGS. 8A and 8B in a wavelength band of 980 to 1650 nm.

In Example 4, the radial type GRIN lens distributing BaO as shown in Example 1 is used as the optical communication lens system 10, but same effects are obtained by using the radial type GRIN lens realized by varied combinations of metal G group (Nb, Ta, Ti, Zr, Fe) and metal F group (Ca, Sr, Ba, Zn, La, In, Y, Zr, Ta), or by using the radial type GRIN lens having the DOE as shown in Example 3. However, in the radial type GRIN lens having the DOE, the DOE side is positioned oppositely to the SMF 20.

In Example 4, the SMF 20 is used, but other fibers may be also used, such as a dispersion shift fiber or an Er-doped fiber.

EXAMPLE 5

Figure 9:
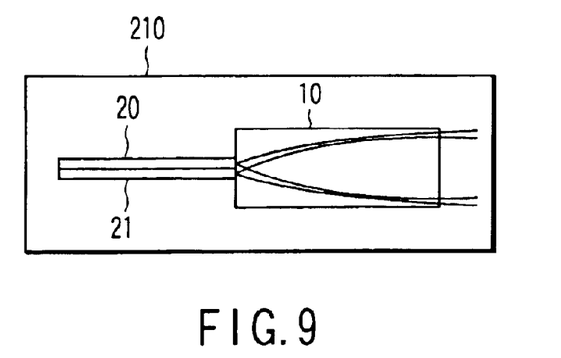
FIG. 9 is a block diagram of a two-core fiber collimator according to Example 5 of the second embodiment of the invention.

A two-core optical fiber collimator 210 of Example 5 is composed of the optical communication lens system 10 and SMF 20, 21 as shown in FIG. 9. The optical communication lens system 10 is the La system GRIN lens shown in Example 2, and the SMF 20 and 21 are coupled symmetrically about the optical axis of the optical communication lens system 10. As shown in Example 2, the La system radial type GRIN lens is favorable corrected in the chromatic aberration and other aberrations at the image height of 0.125 mm. Therefore, even when the light enters the optical communication lens system 10 from the SMF 20, 21 in a range of 980 to 1650 nm, it is favorably collimated. Further, even when the collimating light in a wavelength band of 980 to 1650 nm enters the optical communication lens system 10 at a desired angle to the SMF 20, 21, it is coupled at high efficiency regardless of the wavelength.

The radial type GRIN lens used in the optical communication lens system 10 in Example 5 may also be replaced by the Ba system radial type GRIN lens shown in Example 1 or the radial type GRIN lens having the DOE shown in Example 3, and the optical fiber is not limited to the SMF alone.

(Third Embodiment)

A third embodiment of the invention relates to an in-line type optical isolator composed of an optical fiber collimator shown in the second embodiment and a free space type optical isolator 30. An example of the third embodiment is shown below.

EXAMPLE 6

Figure 10:
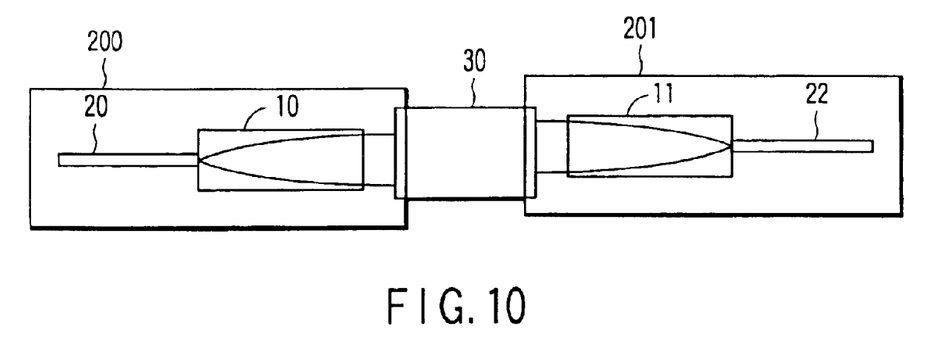
FIG. 10 is a block diagram of an optical isolator according to Example 6 of a third embodiment of the invention.

An in-line type optical isolator in Example 6 of the third embodiment is composed of, as shown in FIG. 10, the free space type optical isolator 30, and optical fiber collimators 200, 201 shown in Example 4. Herein, the optical fiber collimators 200 and 201 are identical in the specification.

For favorable function of the free space type optical isolator in the third embodiment, the collimating light must be entered as strictly as possible. However, since the optical fiber collimator 200 shown in Example 4 can generate the collimating lens favorably, regardless of the wavelength, in the light in the wavelength band of 980 to 1650 nm, it can function also favorably as the in-line type optical isolator.

The example of in-line type optical isolator is shown herein, but the optical communication lens system shown in the first embodiment can be also used sufficiently in the optical isolator for LD.

Herein, the optical isolator is explained as an optical communication component using the light communication system of the invention. Moreover, the optical communication lens system of the invention can be applied in various light communication components using optical fiber collimators such as a three-port optical circulator, a four-port optical circulator, an optical attenuator, and an optical ADM (add/drop multiplexer).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical system for optical communications, comprising a graded index lens composed of a transparent material including at least one metal oxide with valence of 2 or more, and having a refractive index distribution formed by changing the molar ratio of the metal oxide.

2. The optical system for optical communications according to claim 1, wherein the metal oxide includes $Fe_2O_3$.

3. The optical system for optical communications according to claim 1, wherein said at least one metal oxide includes a first metal oxide containing at least one metal element of Nb, Ta, Ti, Zr, and Fe, and a second metal oxide containing at least one metal element of Ca, Sr, Ba, Zn, La, In, Y, Zr, and Tr, the concentrations of the respect metal element are distributed in mutually reverse directions with respect to the radial direction.

4. The optical system for optical communications according to claim 1, wherein said at least one metal oxide includes a first metal oxide containing at least one metal element of Nb, Ta, Ti, Zr, and Fe, and the molar ratio of a second metal oxide containing at least one metal element of Ca, Sr, Ba, Zn, La, In, Y, Zr, and Tr, the molar ratio of said at least one metal oxide is varied.

5. The optical system for optical communications according to claim 1, wherein the graded index lens has a dispersion coefficient $V_1$ obtained by the following formula (1) satisfying the relation of $V_1 > 100$:

$$V_1 = V_{1,1550} / (N_{1,980} - N_{1,1650}) \tag{1}$$

where $N_{1,1550}$ denotes a secondary coefficient of refractive index at wavelength of 1550 nm;

$N_{1,980}$ denotes a secondary coefficient of refractive index at wavelength of 980 nm; and $N_{1,1650}$ denotes a secondary coefficient of refractive index at wavelength of 1650 nm.

6. The optical system for optical communications according to claim 1, wherein the transparent material having the specified refractive index distribution is formed by a sol-gel method.

7. The optical system for optical communications according to claim 1, wherein a diffractive optical element having a positive power is configured on one side of the graded index lens.

8. The optical system for optical communications according to claim 1, wherein the both end faces of the graded index lens are flat planes.

9. An optical component for optical communications configured by further connecting at least one optical fiber to the optical system for optical communications according to claim 1.

10. An optical component for optical communications configured by further connecting an optical isolator to the optical system for optical communications according to claim 9.

11. A method of manufacturing an optical system for optical communications, comprising:

forming a transparent material having a refractive index distribution by changing the molar ratio of metal oxide with valence of 2 or more; and configuring a graded index lens from the transparent material.

12. The method according to claim 11, wherein the metal oxide includes $Fe_2O_3$.

13. The method according to claim 11, wherein said at least one metal oxide includes a first metal oxide containing at least one metal element of Nb, Ta, Ti, Zr, and Fe, and a second metal oxide containing at least one metal element of Ca, Sr, Ba, Zn, La, In, Y, Zr, and Tr, the concentrations of the respect metal element are distributed in mutually reverse directions with respect to the radial direction.

14. The method according to claim 11, wherein said at least one metal oxide includes a first metal oxide containing at least one metal element of Nb, Ta, Ti, Zr, and Fe, and the molar ratio of a second metal oxide containing at least one metal element of Ca, Sr, Ba, Zn, La, In, Y, Zr, and Tr, the molar ratio of said at least one metal oxide is varied.

15. The method according to claim 11, wherein the graded index lens has a dispersion coefficient $V_1$ obtained by the following formula (1) satisfying the relation of $V_1 > 100$:

$$V_1 = V_{1,1550} / (N_{1,980} - N_{1,1650}) \tag{1}$$

where $N_{1,1550}$ denotes a secondary coefficient of refractive index at wavelength of 1550 nm;

$N_{1,980}$ denotes a secondary coefficient of refractive index at wavelength of 980 nm; and $N_{1,1650}$ denotes a secondary coefficient of refractive index at wavelength of 1650 nm.

16. The method according to claim 11, wherein the transparent material having the specified refractive index distribution is formed by a sol-gel method.

* * * * *

UNITED STATES PATENT AND TRADEMARK OFFICE
CERTIFICATE OF CORRECTION

PATENT NO.    : 6,831,791 B2
DATED         : December 14, 2004
INVENTOR(S)   : Mitsuru Namiki et al.

It is certified that error appears in the above-identified patent and that said Letters Patent is hereby corrected as shown below:

Column 11,
Lines 22 and 30, change "Tr" to -- Ta --.

Column 12,
Lines 27 and 34, change "Tr" to -- Ta --.

Signed and Sealed this

Thirteenth Day of September, 2005

JON W. DUDAS
*Director of the United States Patent and Trademark Office*